US009938891B2

(12) United States Patent
Casal Kulzer et al.

(10) Patent No.: US 9,938,891 B2
(45) Date of Patent: Apr. 10, 2018

(54) METHOD AND CONTROL DEVICE FOR OPERATING AN INTERNAL COMBUSTION ENGINE

(71) Applicant: Dr. Ing. h.c. F. Porsche Aktiengesellschaft, Stuttgart (DE)

(72) Inventors: Andre Casal Kulzer, Boeblingen (DE); Erwin Rutschmann, Tiefenbronn (DE); Thorben Walder, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 88 days.

(21) Appl. No.: 14/935,643

(22) Filed: Nov. 9, 2015

(65) Prior Publication Data
US 2016/0138490 A1    May 19, 2016

(30) Foreign Application Priority Data
Nov. 13, 2014    (DE) .......................... 10 2014 116 639

(51) Int. Cl.
*F02B 33/44*    (2006.01)
*F02B 33/00*    (2006.01)
(Continued)

(52) U.S. Cl.
CPC .......... *F02B 37/001* (2013.01); *F01N 13/107* (2013.01); *F02B 37/007* (2013.01);
(Continued)

(58) Field of Classification Search
CPC ...... F02B 37/001; F02B 37/007; F02B 37/18; F02B 29/0412; F01N 13/107;
(Continued)

(56) References Cited

U.S. PATENT DOCUMENTS 5,186,005 A * 2/1993 Yoshioka .............. F02B 37/007
                                                          60/612
8,720,200 B2 * 5/2014 Tsukamoto ......... F02D 41/0007
                                                          60/612
(Continued)

FOREIGN PATENT DOCUMENTS

DE    10 2006 042 443    3/2008
DE    10 2008 007 784    8/2008
(Continued)

OTHER PUBLICATIONS

Korean Office Action Dated May 25, 2016.
German Search Report of Oct. 9, 2015.

*Primary Examiner* — Thai Ba Trieu
(74) *Attorney, Agent, or Firm* — Gerald E. Hespos; Michael J. Porco; Matthew T. Hespos

(57) ABSTRACT

A method is provided for operating an internal combustion engine (10) that has at least one cylinder row (11a, 11b) with multiple cylinders (12a, 12b). Each cylinder row (11a, 11b) has a first exhaust-gas turbocharger (13a, 13b) and a second exhaust-gas turbocharger (14a, 14b). The method includes providing charge air for the cylinders (12a, 12b) of the internal combustion engine (10) either exclusively by the first exhaust-gas turbocharger (13a, 13b) of the cylinder row (11a, 11b) of the internal combustion engine (10) or by both the first exhaust-gas turbocharger (13a, 13b) of the cylinder row (11a, 11b) of the internal combustion engine (10) and the second exhaust-gas turbocharger (14a, 14b) of the cylinder row (11a, 11b) of the internal combustion engine (10) in a manner dependent on an operating mode demanded by a driver and/or by a controller for the internal combustion engine (10).

10 Claims, 4 Drawing Sheets

(51) Int. Cl.
*F02D 23/00* (2006.01)
*F02B 37/00* (2006.01)
*F01N 13/10* (2010.01)
*F02B 37/007* (2006.01)
*F02B 37/18* (2006.01)
*F02D 13/02* (2006.01)
*F02D 41/00* (2006.01)
*F02B 29/04* (2006.01)

(52) U.S. Cl.
CPC .......... *F02B 37/18* (2013.01); *F02D 13/0246* (2013.01); *F02D 13/0257* (2013.01); *F02D 23/00* (2013.01); *F02D 41/0007* (2013.01); *F02D 41/0082* (2013.01); *F02B 29/0412* (2013.01); *F02D 2200/0802* (2013.01); *F02D 2200/0804* (2013.01); *Y02T 10/144* (2013.01); *Y02T 10/18* (2013.01)

(58) Field of Classification Search
CPC .. F02D 13/0246; F02D 13/0257; F02D 23/00; F02D 41/0007; F02D 41/0082; F02D 2200/0802; F02D 2200/0804; Y02T 10/144; Y02T 10/18
USPC ................ 60/612, 611, 605.1, 602; 123/562; 701/101–102
See application file for complete search history.

(56) References Cited

U.S. PATENT DOCUMENTS

| | | | |
|---|---|---|---|
| 2008/0196409 A1 | 8/2008 | Goebelbecker et al. | |
| 2009/0038309 A1 | 2/2009 | Cocca et al. | |
| 2011/0296830 A1* | 12/2011 | Tsukamoto | F02D 41/0007 60/602 |
| 2015/0275771 A1* | 10/2015 | Pochner | F02D 41/0007 701/103 |

FOREIGN PATENT DOCUMENTS

| | | | | |
|---|---|---|---|---|
| DE | 10 2007 037 087 | | 2/2009 | |
| DE | 10 2007 046 655 | | 4/2009 | |
| DE | 10 2007 046 656 | | 4/2009 | |
| DE | 10 2008 036 308 | | 2/2010 | |
| DE | 10 2008 055 896 | | 5/2010 | |
| DE | 10 2012 217 988 | | 4/2014 | |
| EP | 2 801 713 | | 11/2014 | |
| JP | H02094332 U | | 7/1990 | |
| JP | 2007177794 A | | 7/2007 | |
| JP | 2009191668 A | | 8/2009 | |
| JP | 2010190053 A | * | 9/2010 | ............ F02B 37/013 |
| JP | 2010236447 A | * | 10/2010 | ............ F02B 37/013 |
| JP | 2011058401 A | | 3/2011 | |

* cited by examiner

METHOD AND CONTROL DEVICE FOR OPERATING AN INTERNAL COMBUSTION ENGINE

CROSS REFERENCE TO RELATED APPLICATION

This application claims priority under 35 USC 119 to German Patent Appl. No. 10 2014 116 639.6 filed on Nov. 13, 2014, the entire disclosure of which is incorporated herein by reference.

BACKGROUND

1. Field of the Invention

The invention relates to a method for operating an internal combustion engine and to a control device for carrying out the method.

2. Description of the Related Art

DE 10 2007 046 655 A1 discloses an internal combustion engine that has a cylinder row of multiple cylinders. Each cylinder of the cylinder row has multiple outlet valves for exhaust gas. More particularly, a first exhaust-gas duct couples first outlet valves of the cylinders of the cylinder row to a first turbine of a first exhaust-gas turbocharger, and a second outlet duct couples second outlet valves to a turbine of a second exhaust-gas turbocharger. A first charge-air line couples a compressor of the first exhaust-gas turbocharger to the cylinders of the cylinder row, and a second charge-air line couples a compressor of the second exhaust-gas turbocharger to the cylinders of the cylinder row. Exhaust gas exiting the cylinders of the internal combustion engine is conducted either exclusively via the first exhaust-gas turbocharger or alternatively via both the first and second exhaust-gas turbochargers. The two exhaust-gas turbochargers are connected in parallel with one another. When the exhaust gas is conducted exclusively via the turbine of the first exhaust-gas turbocharger, the exhaust gas exits the cylinders exclusively via the first outlet valves of said cylinders. By contrast, when the exhaust gas is conducted in parallel via the turbines of both exhaust-gas turbochargers, the exhaust gas can exit the cylinders of the cylinder row via both outlet valves in parallel. Such an internal combustion engine also is referred to as an internal combustion engine with sequential supercharging.

Internal combustion engines with sequential supercharging are known from DE 10 2007 046 655 A1, DE 10 2007 046 656 A1 and DE 10 2008 036 308 B4. However, there is a demand for improving the operation of such an internal combustion engine to utilize the sequential supercharging optimally.

It is an object of the invention to provide a novel method for operating an internal combustion engine, and a control device for carrying out the method.

SUMMARY

According to the invention, charge air for the cylinders of the internal combustion engine is provided either exclusively by the first exhaust-gas turbocharger of the or of each cylinder row of the internal combustion engine or both by the first and second exhaust-gas turbochargers of the or of each cylinder row of the internal combustion engine in a manner dependent on an operating mode demanded by a driver and/or by a controller for the internal combustion engine. Thus, the decision how charge air is provided via the exhaust-gas turbochargers is made in a manner dependent on an operating mode demanded by a driver and/or by a controller.

The exhaust gas may be conducted virtually exclusively via the first exhaust-gas turbocharger when charge air is provided exclusively by the first exhaust-gas turbocharger of a cylinder row of the internal combustion engine. In this case, a small exhaust-gas flow rate may be conducted via the second exhaust-gas turbocharger to keep the second exhaust-gas turbocharger running. However, the second exhaust-gas turbocharger does not provide charge air for the cylinders of the internal combustion engine. Alternatively, the entire exhaust-gas flow rate may be conducted via the first exhaust-gas turbocharger.

When charge air for the cylinders of the internal combustion engine is provided by both the first and second exhaust-gas turbochargers of a cylinder row, the exhaust gas is conducted partially via each of the first and second exhaust-gas turbochargers so that both exhaust-gas turbochargers participate in the provision of the charge air.

Charge air for the cylinders of the internal combustion engine may be provided either exclusively by the first exhaust-gas turbocharger of a cylinder row of the internal combustion engine or both by the first and second exhaust-gas turbochargers of the cylinder row of the internal combustion engine in a manner dependent on the operating mode demanded by a driver and/or by a controller for the internal combustion engine, and specifically in a manner dependent on the torque provided by the internal combustion engine and/or on the speed of the internal combustion engine. This torque-dependent and/or engine speed-dependent provision of charge air by the exhaust-gas turbochargers of the internal combustion engine may be utilized in an economy operating mode of the internal combustion engine. The economy operating mode provides charge air for the cylinders of the internal combustion engine exclusively by the first exhaust-gas turbocharger of a cylinder row of the internal combustion engine when the torque provided by the internal combustion engine is relatively high but speeds of the internal combustion engine are relatively low. Conversely, charge air for the cylinders of the internal combustion engine is provided both by the first and second exhaust-gas turbochargers of the cylinder row of the internal combustion engine at relatively high speeds and high torque of the internal combustion engine.

Charge air for the cylinders of the internal combustion engine may be provided both by the first and second exhaust-gas turbochargers of a cylinder row in the economy operating mode of the internal combustion engine, when the torque provided by the internal combustion engine is relatively low regardless of the speed of the internal combustion engine. In this way, the sequential supercharging can be utilized advantageously in an economy operating mode demanded by a controller or by a driver, thereby achieving low fuel consumption. The economy operating mode may be demanded by a driver by actuation of a corresponding button or switch.

Charge air for the cylinders of the internal combustion engine may be provided either exclusively by the first exhaust-gas turbocharger of a cylinder row of the internal combustion engine or both by the first and second exhaust-gas turbochargers of the cylinder row in a manner dependent on the operating mode demanded by a driver and/or by a controller and in a manner dependent on the power of the internal combustion engine. This power-dependent provision of charge air may be utilized in a sport operating mode of the internal combustion engine, which is an operating mode of the internal combustion engine configured for driving operation with high driving dynamics. Specifically, charge air for the cylinders of the internal combustion engine is provided by both the first and second exhaust-gas turbochargers of a cylinder row of the internal combustion engine in the sport operating mode of the internal combustion engine when relatively high power of the internal combustion engine is demanded by a driver.

Charge air for the cylinders of the internal combustion engine is provided exclusively by the first exhaust-gas turbocharger of a cylinder row of the internal combustion engine in the sport operating mode of the internal combustion engine when relatively low power of the internal combustion engine is demanded by a driver. In this way, the sequential supercharging can be utilized advantageously in a sport operating mode demanded by a controller or by a driver of the internal combustion engine. The sport operating mode of the internal combustion engine may be demanded by a driver by actuation of a corresponding button or switch.

Charge air for the cylinders of the internal combustion engine may be provided exclusively by the first exhaust-gas turbocharger of a cylinder row of the internal combustion engine when a catalytic converter heating operating mode is demanded upon a cold start of the internal combustion engine. In this way, the sequential supercharging can be utilized advantageously for heating a catalytic converter of the internal combustion engine after a cold start of the internal combustion engine.

Exemplary embodiments of the invention will be discussed in more detail on the basis of the drawing, without the invention being restricted to these embodiments.

DETAILED DESCRIPTION

Figure 1:
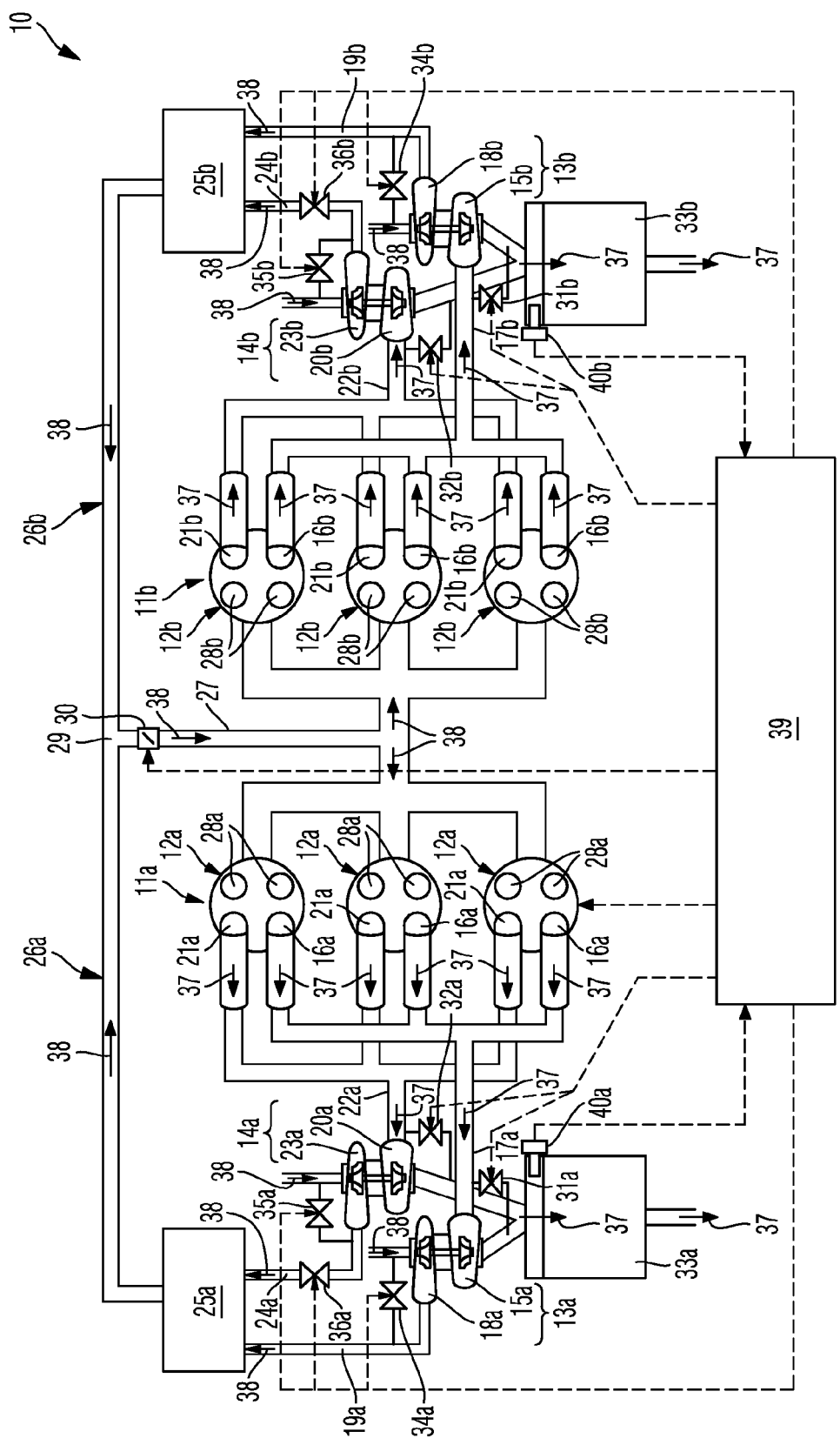
FIG. 1 is a schematized illustration of an internal combustion engine.

FIG. 1 schematically illustrates an internal combustion engine 10 that can be operated in accordance with the method of the invention and/or the control device of the invention. The internal combustion engine 10 of FIG. 1 comprises two cylinder rows 11a, 11b with multiple cylinders 12a, 12b in each row. Each cylinder row 11a, 11b is assigned two exhaust-gas turbochargers 13a, 14a and 13b, 14b respectively.

First exhaust-gas turbochargers 13a, 13b of each cylinder row 11a, 11b are coupled to the cylinders 12a, 12b of the respective cylinder row 11a, 11b so that the exhaust gas of the respective cylinders 12a, 12b can be supplied to a turbine 15a, 15b of the respective first exhaust-gas turbocharger 13a, 13b proceeding from first outlet valves 16a, 16b of the cylinders 12a, 12b. The first outlet valves 16a, 16b of the cylinders 12a, 12b of the respective cylinder row 11a, 11b are coupled via a first exhaust line 17a, 17b to the respective turbine 15a, 15b of the respective first exhaust-gas turbocharger 13a, 13b.

Energy obtained in the turbines 15a, 15b of the first exhaust-gas turbochargers 13a, 13b is utilized in compressors 18a, 18b of the respective first exhaust-gas turbochargers 13a, 13b to compress charge air in the compressors. The charge air can be supplied from the compressors 18a, 18b of the first exhaust-gas turbochargers 13a, 13b to the cylinders 12a, 12b of the internal combustion engine 10 via first charge-air lines 19a, 19b.

The two exhaust-gas turbochargers 13a, 14a and 13b, 14b associated with each respective cylinder row 11a, 11b are connected in parallel. The exhaust gas of the cylinders 12a, 12b of the respective cylinder row 11a, 11b can be supplied to a turbine 20a, 20b of the respective second exhaust-gas turbocharger 14a, 14b of the respective cylinder row 11a, 11b proceeding from second outlet valves 21a, 21b of the cylinders 12a, 12b via a second exhaust line 22a, 22b. Energy obtained in the turbines 20a, 20b of the second exhaust-gas turbochargers 14a, 14b is utilized in compressors 23a, 23b of the second exhaust-gas turbochargers 14a, 14b to compress charge air. The charge air can be supplied from the compressors 23a, 23b of the second exhaust-gas turbochargers 14a, 14b to the cylinders 12a, 12b via a second charge-air line 24a, 24b.

In the exemplary embodiment of the internal combustion engine 10 shown in FIG. 1, each cylinder row 11a, 11b is assigned a charge-air cooler 25a, 25b. The charge-air lines 19a, 24a of the exhaust-gas turbochargers 13a, 14a of the cylinder row 11a issue into the charge-air cooler 25a, and the charge-air lines 19b, 24b of the exhaust-gas turbochargers 13b, 14b of the cylinder row 11b issue into the charge-air cooler 25b. Cooled charge air can be supplied from the charge-air coolers 25a, 25b, via charge-air lines 26a, 26b, 27 to the cylinders 12a, 12b of the cylinder rows 11a, 11b. Compressed charge air passes into the cylinders 12a, 12b via inlet valves 28a, 28b thereof.

The charge-air lines 26a, 26b merge into the charge-air line 27 downstream of the charge-air coolers 25a, 25b, and a throttle flap 30 is in the charge-air line 27 downstream of a merging point 29 of the charge-air lines 26a, 26b as viewed in the flow direction of the charge air.

Each turbine 15a, 15b, 18a, 18b of each of the exhaust-gas turbochargers 13a, 14a, 13b, 14b has a wastegate valve 31a, 31b, 32a, 32b. The wastegate valve 31a assigned to the turbine 15a of the first exhaust-gas turbocharger 13a of the cylinder row 11a enables exhaust gas to be conducted past the turbine 15a of the first exhaust-gas turbocharger 13a of the cylinder row 11a so that the exhaust gas does not flow through the respective turbine 15a, but is supplied, downstream of said turbine 15a directly to a catalytic converter 33a of the respective cylinder row 11a for exhaust-gas purification purposes. The wastegate valve 32a assigned to the turbine 20a of the second exhaust-gas turbocharger 14a of the cylinder row 11a enables exhaust gas to be conducted past the turbine 20a of the second exhaust-gas turbocharger 14a and supplied directly to the catalytic converter 33a. Similarly, the wastegate valves 31b, 32b of the turbines 15b, 20b of the two exhaust-gas turbochargers 13b, 14b of the cylinder row 11b enable exhaust gas exiting the cylinders 12b of the cylinder row 11b to be conducted past the respective turbine 15b, 20b and discharged directly into a catalytic converter 33b assigned to the cylinder row 11b.

The charge-air side of each of the first exhaust-gas turbochargers 13a, 13b has an overrun air recirculation valve 34a, 34b. Compressed charge air can be discharged from the respective first charge-air line 19a, 19b via the respective overrun air recirculation valve 34a, 34b when the respective overrun air recirculation valve 34a, 34b. Thus, the compressed charge air is not supplied to the respective charge-air cooler 25a, 25b, but rather is discharged into the surroundings, for example into an air filter (not shown) assigned to the respective exhaust-gas turbocharger 13a, 13b.

Similarly, the charge air side of each of the second exhaust-gas turbochargers 14a, 14b has an air recirculation valve 35a, 35b and a compressor activation valve 36a, 36b. The flow cross section of the air recirculation valves 35a, 35b may differ from the flow cross section of the overrun air recirculation valves 34a, 34b.

Charge air compressed in the compressors 23a, 23b of the second exhaust-gas turbochargers can be discharged from the respective second charge-air line 24a, 24b into the surroundings via an air filter of the respective exhaust-gas turbocharger when the air recirculation valves 35a, 35b of the second exhaust-gas turbochargers 14a, 14b are open so that the corresponding charge air is not supplied to the respective charge-air cooler 25a, 25b.

The second charge-air lines 24a, 24b are separated in terms of flow from the respective charge-air cooler 25a, 25b when the compressor activation valves 36a, 36b are closed. However, the open compressor activation valves 36a, 36b permit a flow through the second charge-air lines 24a, 24b in the direction of the charge-air coolers 25a, 25b.

Arrows 37 in FIG. 1 denote an exhaust-gas flow, and arrows 38 denote a charge-air flow.

A control device 39 controls the internal combustion engine 10. More particularly, the control device 39 generates control signals for the control, specifically for the control of the outlet valves 16a, 16b, 21a, 21b and for the control of the inlet valves 28a, 28b of the cylinders 12a, 12b, as indicated by the dashed lines in FIG. 1. Furthermore, the control device 39 generates control signals for the control of: the wastegate valves 31a, 31b, 32a, 32b, the overrun air recirculation valves 34a, 34b, the air recirculation valves 35a, 35b, and the compressor activation valves 36a, 36b. Alternatively, the compressor activation valves 36a, 36b may be passive, spring-loaded valves. The control device 39 also generates a control signal for the throttle flap 30.

Each catalytic converter 33a, 33b has a temperature sensor 40a, 40b that provides an actual temperature value of the respective catalytic converter 33a, 33b to the control device 39. A virtual software temperature sensor may be utilized instead of a hardware temperature sensor 40a, 40b to calculate the actual temperature value of the respective catalytic converter 33a, 33b on the basis of a model.

The exhaust gas produced in the cylinders 12a, 12b of the respective cylinder row 11a, 11b can be conducted virtually exclusively via the respective first exhaust-gas turbocharger 13a, 13b or alternatively partially via the first exhaust-gas turbocharger 13a, 13b and partially via the second exhaust-gas turbocharger 14a, 14b of the respective cylinder row 11a, 11b.

When the exhaust gas is conducted virtually exclusively via the first exhaust-gas turbocharger 13a, 13b of the respective cylinder row 11a, 11b, the first outlet valves 16a, 16b are operated with a relatively large valve lift, hereinafter referred to as maximum lift, and the second outlet valves 21a, 21b are operated with a relatively small valve lift, hereinafter referred to as minimum lift. Thus, the exhaust gas is supplied virtually entirely to the turbine 15a, 15b of the respective first exhaust-gas turbocharger 13a, 13b, and only a small exhaust-gas flow rate passes into the region of the turbines 20a, 20b of the second exhaust-gas turbochargers 14a, 14b. In this condition, the air recirculation valve 35a, 35b is open and the compressor activation valve 36a, 36b is closed. Thus, this part of the charge-air flow is not delivered to the cylinders 12a, 12b, but rather is discharged into the surroundings. Charge air for the cylinders then is provided exclusively by the first exhaust-gas turbochargers 13a, 13b. The overrun air recirculation valve 34a, 34b assigned to the respective compressor 18a, 18b of the respective first exhaust-gas turbocharger 13a, 13b is closed in this case.

Alternatively, when charge air is provided exclusively by the first exhaust-gas turbocharger of a cylinder row, the entire exhaust-gas flow rate may be conducted via the first exhaust-gas turbocharger. In this case, the minimum lift is a zero lift.

Charge air for the cylinders 12a, 12b is provided by both exhaust-gas turbochargers 13a, 14b when the exhaust gas of the cylinders 12a, 12b of the respective cylinder row 11a, 11b is conducted partially via the first exhaust-gas turbocharger 13a, 13b and partially via the second exhaust-gas turbocharger 14a, 14b. In this condition, both the first outlet valves 16a, 16b and the second outlet valves 21a, 21b are operated with maximum lift to supply exhaust gas to the turbines 15a, 20a, 15b, 20b of both exhaust-gas turbochargers 13a, 14a, 13b, 14b. Thus, charge air is compressed in the exhaust-gas turbochargers and is supplied to the cylinders 12a, 12b. In this case, both the overrun air recirculation valves 34a, 34b and the air recirculation valves 35a, 35b are closed, while the compressor activation valves 36a, 36b are open.

As stated above, the exhaust gas produced in the cylinders 12a, 12b of the cylinder rows 11a, 11b may be utilized for supercharging of charge air. The charge air for the cylinders 12a, 12b of the internal combustion engine 10 is provided either exclusively by the first exhaust-gas turbocharger 13a, 13b of the cylinder rows 11a, 11b or by both the first exhaust-gas turbocharger 13a, 13b of the cylinder rows 11a, 11b and the second exhaust-gas turbocharger 14a, 14b of the cylinder rows 11a, 11b. The decision as to whether the charge-air supercharging is performed exclusively by the first exhaust-gas turbochargers 13a, 13b or by the first and second exhaust-gas turbochargers 13a, 13b, 14a, 14b is made in a manner dependent on an operating mode demanded by a driver and/or by a controller of the internal combustion engine. In particular, a driver may demand an economy operating mode or a sport operating mode, while the controller of the internal combustion engine may demand a catalytic converter heating operating mode.

In a first embodiment of the method, charge air for the cylinders 12a, 12b of the internal combustion engine 10 is provided either exclusively by the first exhaust-gas turbocharger 13a, 13b of the two cylinder rows 11a, 11b or both by the first exhaust-gas turbocharger 13a, 13b and by the second exhaust-gas turbocharger 14a, 14b of the cylinder rows 11a, 11b in a manner dependent on the operating mode demanded by a driver and/or by a controller for the internal combustion engine, and also in a manner dependent on the demanded power of the internal combustion engine. This power-dependent and operating mode-dependent charge-air supercharging is preferably performed when a sport operating mode for the internal combustion engine is demanded by a driver by actuation of a switch or by actuation of a button.

Figure 2:
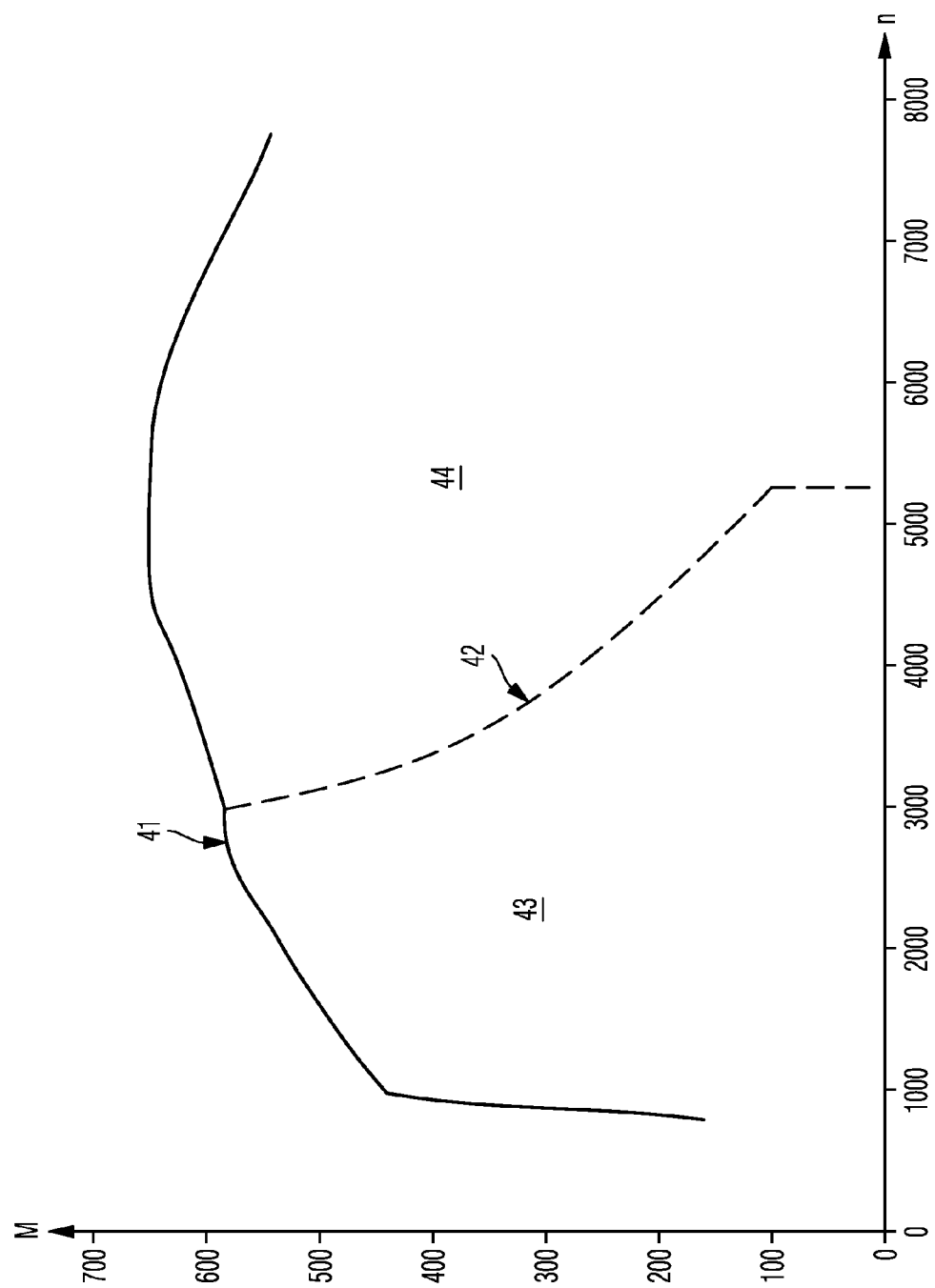
FIG. 2 is a first diagram for illustrating the method of the invention.

FIG. 2 shows a diagram in which a torque M is plotted versus the speed n of the internal combustion engine. The solid line in FIG. 2 corresponds to a full-load characteristic curve 41 of the internal combustion engine. The product of torque M and speed n corresponds to the power of the internal combustion engine. The dashed line in FIG. 2 shows a characteristic map boundary 42 between charge-air supercharging exclusively by the first exhaust-gas turbochargers 13a, 13b of the cylinder rows 11a, 11b and charge-air supercharging by both by the first exhaust-gas turbochargers 13a, 13b and the second exhaust-gas turbochargers 14a, 14b of the cylinder rows 11a, 11b. A switch is made automatically upon overshooting the characteristic map boundary 42.

The operation of providing the charge air exclusively by the respective first exhaust-gas turbochargers 13a, 13b is referred to as a single-charger operation of the respective cylinder row 11a, 11b. The operation of providing charge air by both exhaust-gas turbochargers 13a, 14a and 13b, 14b is referred to as a two-charger operation of the respective cylinder row 11a, 11b.

The charge air for the cylinders 12a, 12b of the internal combustion engine 10 is provided exclusively by the first exhaust-gas turbochargers 13a, 13b of the cylinder rows 11a, 11b when a sport operating mode for the internal combustion engine 10 is demanded, and when the power demanded of the internal combustion engine is relatively low. By contrast, the charge air for the cylinders 12a, 12b of the internal combustion engine 10 is provided both by the first exhaust-gas turbochargers 13a, 13b and by the second exhaust-gas turbochargers 14a, 14b in the sport operating mode, when the power demanded of the internal combustion engine is relatively high.

The region 43 in the engine speed-torque characteristic map of FIG. 2 denotes the sport operating mode of the internal combustion engine 10 where the charge-air supercharging is performed exclusively by the first exhaust-gas turbochargers 13a, 13b. The region 44 of the engine speed-torque characteristic map of FIG. 2 denotes the sport operating mode of the internal combustion engine 10 where the charge-air supercharging is performed by both the first exhaust-gas turbochargers 13a, 13b and the second exhaust-gas turbochargers 14a, 14b.

Figure 3:
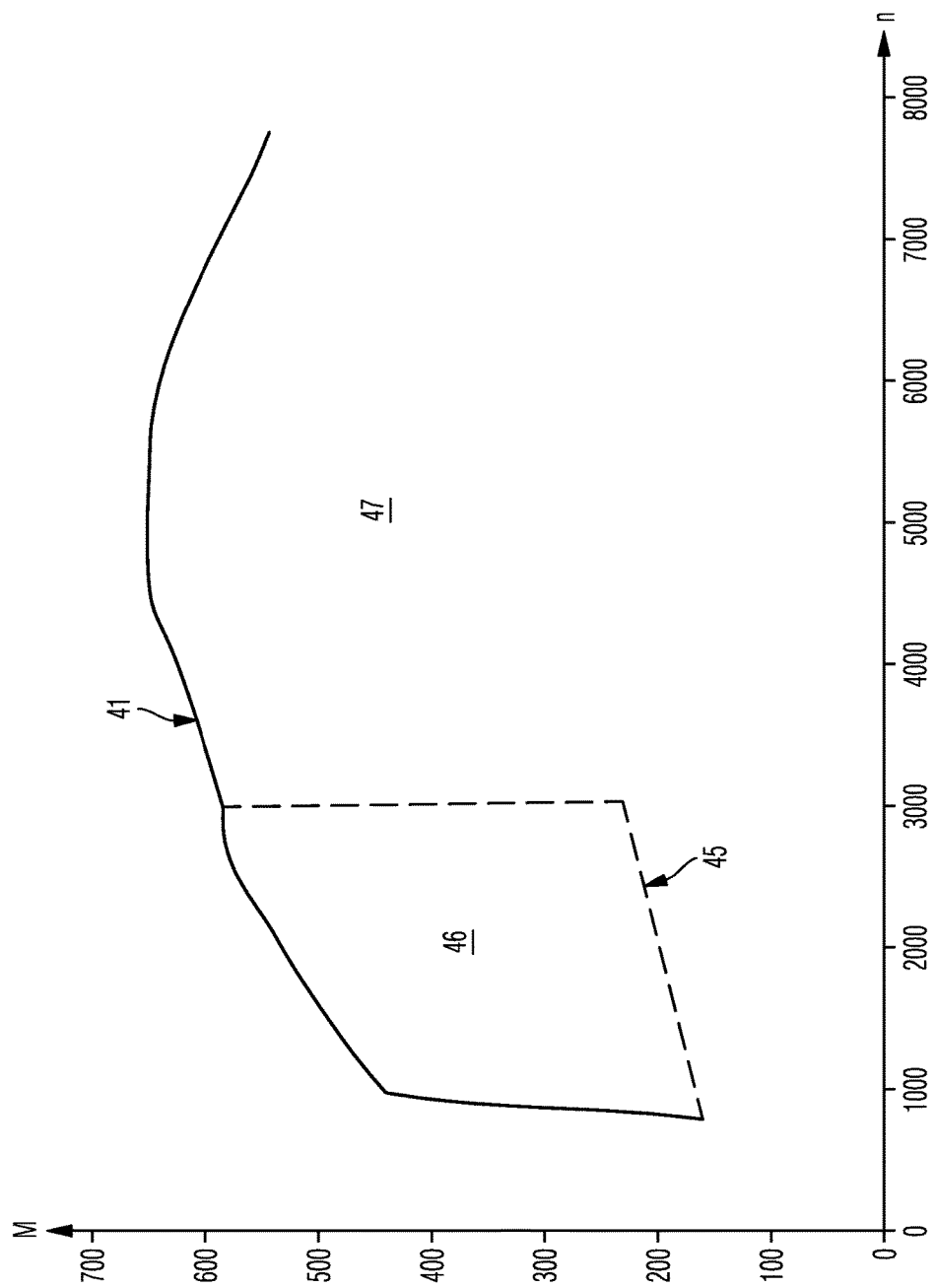
FIG. 3 is a second diagram for illustrating the method of the invention.

FIG. 3 illustrates the engine speed-torque characteristic curve when an economy operating mode for the internal combustion engine 10 is demanded by a driver by actuation of a switch or a button. The engine speed-torque characteristic curve of FIG. 3 shows the full-load characteristic curve 41 and a characteristic map boundary 45 that separates a region 46 in which the charge-air supercharging is performed exclusively by the first exhaust-gas turbochargers 13a, 13b from a region 47 in which the charge-air supercharging is performed by both the first exhaust-gas turbochargers 13a, 13b and the second exhaust-gas turbochargers 14a, 14b.

Region 46 of the characteristic map of FIG. 3 identifies conditions where charge air for the cylinders 12a, 12b of the internal combustion engine 10 is provided exclusively by the first exhaust-gas turbochargers 13a, 13b of the two cylinder rows 11a, 11b of the internal combustion engine 10 when an economy operating mode for the internal combustion engine 10 is demanded and when the torque M provided by the internal combustion engine is relatively high at relatively low speeds n of the internal combustion engine in the characteristic map region 46. On the other hand, region 47 of the characteristic map of FIG. 3 identifies conditions where the charge air for the cylinders 12a, 12b is provided by both the first exhaust-gas turbochargers 13a, 13b and the second exhaust-gas turbochargers 14a, 14b of the two cylinder rows 11a, 11b in the case of relatively high torques M and relatively high speeds n of the internal combustion engine 10 in the economy operating mode.

In the economy operating mode, when the torque M provided by the internal combustion engine is relatively low, the charge air for the cylinders 12a, 12b is provided both by the first exhaust-gas turbochargers 13a, 13b and by the second exhaust-gas turbochargers 14a, 14b of the cylinder rows 11a, 11b regardless of the speed n of the internal combustion engine 10 in the characteristic map region 47. Accordingly, in the economy operating mode, the charge-air supercharging is performed independently of the torque M and independently of the speed n of the internal combustion engine 10.

As stated above, the economy operating mode is designed for fuel-saving operation of the internal combustion engine 10. On the other hand, the sport operating mode is designed for operation with high driving dynamics. The driver can demand the economy operating mode or the sport driving mode by actuating a switch or a button.

A catalytic converter heating operating mode is demanded by a controller in the event of a cold start of the internal combustion engine 10 or as a result of a catalytic converter temperature being identified as being too low by a hardware or virtual temperature sensor 40a, 40b. Charge air for the cylinders 12a, 12b of the internal combustion engine 10 is provided exclusively by the first exhaust-gas turbocharger 13a, 13b of the cylinder rows 11a, 11b in the catalytic converter heating operating mode.

According to the invention, supercharging of the charge air can be performed independently of an operating mode demanded by a driver and/or by a controller, of the internal combustion engine 10, wherein the charge air is provided either by both exhaust-gas turbochargers 13a, 14a and 13b, 14b, of each cylinder row 11a, 11b or exclusively by a single exhaust-gas turbocharger 13a, 13b of each cylinder row 11a, 11b.

Single-charger operation is implemented at the respective cylinder row 11a, 11b when charge air for the cylinders 12a, 12b of the internal combustion engine 10 is provided exclusively by the first exhaust-gas turbochargers 13a, 13b of the respective cylinder row 11a, 11b. The first outlet valves 16a, 16b are operated with a relatively large valve lift or with maximum lift and the second outlet valves 21a, 21b are operated with a relatively small valve lift or with minimum lift or alternatively with zero lift when the single-charger operation is implemented at the respective cylinder row 11a, 11b. During this single-charger operation of the respective cylinder row 11a, 11b, in a steady-state operating state, the respective overrun air recirculation valve 34a, 34b is closed, the respective air recirculation valve 35a, 35b is open, and the respective compressor activation valve 36a, 36b is closed.

The respective cylinder row 11a, 11b is operated in two-charger operation when charge air for the cylinders 12a, 12b of the internal combustion engine is provided by both exhaust-gas turbochargers 13a, 13b, 14a, 14b of the cylinder rows 11a, 11b. During such two-charger operation, both outlet valves 16a, 16b, 21a, 21b of each cylinder 12a, 12b are operated with relatively large valve lift or with maximum lift. In the case of two-charger operation of the respective cylinder row 11a, 11b, in a steady-state operating mode, the respective overrun air recirculation valve 34a, 34b is closed, the respective air recirculation valve 35a, 35b is closed, and the respective compressor activation valve 36a, 36b is open.

Defined measures are implemented to switch optimally from single-charger operation of the respective cylinder row 11a, 11b to two-charger operation thereof above the induction-based full load of the internal combustion engine 10, while avoiding turbo lag. The defined measures are implemented first in preparation for the switch and second to perform the actual switch from single-charger operation to two-charger operation of the respective cylinder row 11a, 11b. When the internal combustion engine is operated above the induction-based full load, and when a speed of the internal combustion engine 10 reaches or overshoots a threshold value, a charge pressure or an intake pipe pressure is increased in preparation for the switch from single-charger operation to two-charger operation of the respective cylinder row 11a, 11b to maintain a driver demand torque and to build up a torque reserve and a charge pressure reserve. When the charge pressure reaches or overshoots a threshold value, a switch is made from single-charger operation to two-charger operation of the respective cylinder row 11a, 11b, and subsequently, the torque reserve and the charge-pressure reserve are eliminated again. The charge-pressure reserve is dependent on the pressure upstream of the throttle flap or on the pressure in the intake pipe.

Further details regarding the switch from single-charger operation to two-charger operation of the respective cylinder row 11a, 11b in the event of operation of the internal combustion engine 10 above the induction-based full load are described below with reference to FIG. 4 where multiple curve profiles with respect to time are plotted versus the time t.

A curve profile 48 visualizes a profile with respect to time of the speed of the internal combustion engine 10. A curve profile 49 visualizes the present charger operation of the respective cylinder row 11a, 11b, where the state "0" corresponds to single-charger operation, and the state "1" corresponds to two-charger operation of the respective cylinder row 11a, 11b. Curve profiles 50 and 51 visualize the state of the wastegate valves 31a, 31b and 32a, 32b. More particularly, the curve profile 50 visualizes the state of the wastegate valves 31a, 31b that interact with the respective first exhaust-gas turbocharger 13a, 13b of the respective cylinder row 11a, 11b, whereas the curve profile 51 visualizes the state of the wastegate valves 32a, 32b that interact with the respective second exhaust-gas turbocharger 14a, 14b of the respective cylinder row 11a, 11b. A curve profile 52 visualizes the state of the air recirculation valves 35a, 35b that are assigned to the second charge-air lines 24a, 24b. A curve profile 53 visualizes the state of the overrun air recirculation valves 34a, 34b that are assigned to the first charge-air lines 19a, 19b. A curve profile 54 illustrates the profile with respect to time of an ignition angle of the internal combustion engine 10. A curve profile 57 illustrates a controller demand for a charge pressure upstream of the throttle flap 30. A curve profile 56 illustrates a controller demand for a torque reserve. A curve profile 55 illustrates the profile with respect to time of the charge pressure that is actually generated.

Figure 4:
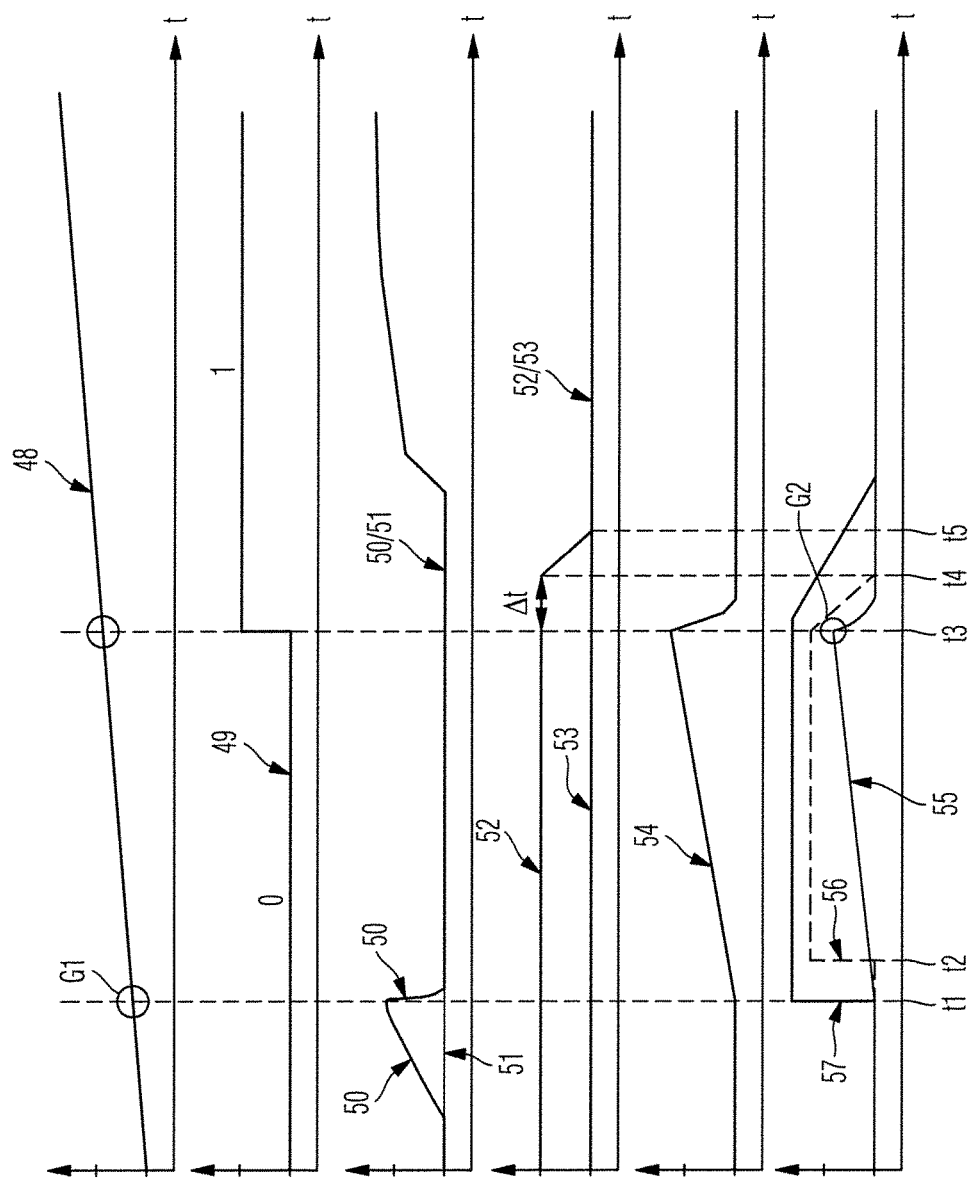
FIG. 4 is a third diagram for illustrating the method of the invention.

Before the time t1 in FIG. 4, the cylinder rows 11a, 11b of the internal combustion engine 10 are operated in single-charger operation. Thus, the outlet valves 16a, 16b of the cylinders 12a, 12b of the cylinder rows 11a, 11b are operated with maximum lift and the outlet valves 21a, 21b of the cylinders 12a, 12b of the cylinder rows 11a, 11b are operated with minimum lift or with zero lift. As per the curve profile 52, the air recirculation valves 35a, 35b are open before the time t1, whereas the overrun air recirculation valves 34a, 34b are closed. Likewise, before the time t1, the compressor activation valves 36a, 36b are closed. The wastegate valves 31a, 31b interact with the first exhaust-gas turbochargers 13a, 13b and regulate the required charge pressure before the time t1 as per the curve profile 50. The throttle flap 30 is open. As per the curve profile 54, the ignition angle is set to an ignition angle to ensure optimum efficiency of the engine 10. The outlet valves 21a, 21b are operated with minimal lift or alternatively with zero lift. Thus, a minimal exhaust-gas flow rate, or no exhaust gas at all, passes into the region of the second exhaust-gas turbochargers 14a, 14b. Rather, the air recirculation valves 35a, 35b open so that the charge air is discharged to the surroundings. Then, no counterpressure is generated at the closed compressor activation valves 36a, 36b to avoid an increase in temperature of the charge air. A fuel-air mixture is set to the mixture quality required by the present operating strategy, for example to a lambda value of 1.

At the time t1, as per the curve profile 48, the speed of the internal combustion engine 10 overshoots a threshold value G1. Here, a controller identifies that the cylinder rows 11a, 11b are to be switched from single-charger operation to two-charger operation.

The preparation for the switch starts at the time t1 in FIG. 4 and is completed at the time t3. The switch of the respective cylinder row 11a, 11b from single-charger operation to two-charger operation is performed following the time t3.

A controller demands an increase in the charge pressure upstream of the throttle flap 30 starting at the time t1 in the curve profile 57 in preparation for the switch from single-charger operation to two-charger operation of the respective cylinder row 11a, 11b in the event of operation of the internal combustion engine 10 above the induction-based full load. A torque reserve also is demanded by a controller at the time t2 in the curve profile 56.

Furthermore, at the time t1 in the curve profile 50, previously open wastegate valves 31a, 31b are closed, and closed wastegate valves 32a, 32b are kept closed. The ignition angle is adjusted in a retarding direction from the position for optimum efficiency, as per the curve profile 54, to maintain a driver demand torque following the increase in the charge pressure upstream of the throttle flap 30 in the case of a constant driver demand torque. The adjustment of the ignition angle is performed with the aim of maintaining a driver demand torque unchanged, in particular keeping the driver demand torque constant. Thus, a torque reserve can be provided in this way.

During the preparation for the switch between the times t1 and t3, the first outlet valves 16a, 16b of the cylinders 12a, 12b of the cylinder rows 11a, 11b continue to be operated with maximum lift, and the outlet valves 21a, 21b of said cylinders continue to be operated with minimum lift or alternatively with zero lift.

Between the times t1 and t3, the air recirculation valves 35a, 35b are held open, as per the curve profile 52, and the overrun air recirculation valves 34a, 34b are kept closed, as per the curve profile 53. Likewise, during the preparation for the switch from single-charger operation to two-charger operation of the respective cylinder row 11a, 11b, the respective compressor activation valve 36a, 36b also is kept closed. To ensure the desired increase in charge air upstream of the throttle flap 30, it is possible, if appropriate, for the throttle flap 30 to be partially closed.

During the preparation for the switch, the quality of a fuel-combustion air mixture is adapted to the mixture quality demanded by the operating strategy, for example to a lambda value of 1.

At the time t3, the charge pressure overshoots or reaches a threshold value G2 (see curve profile 55). At the time t3, the preparation for the switch from single-charger operation to two-charger operation of the respective cylinder row 11a, 11b is completed. As shown from the curve profile 49, at the time t3, a switch is made to two-charger operation at the respective cylinder row 11a, 11b. Starting at the time t3, all of the outlet valves 16a, 21a and 16b, 21b of the cylinders 12a, 12b of the respective cylinder row 11a, 11b are operated with maximum lift.

The flow cross section of the air recirculation valves 35a, 35b may be relevant to avoid surging of the compressor that is to be activated during the switch to two-charger operation. Surging, or a backward flow of already-compressed charge air, can lead to undesired noises and mechanical loading of the exhaust-gas turbocharger. This can be avoided through corresponding dimensioning of the flow cross section of the air recirculation valves 35a, 35b.

Accordingly, those outlet valves 21a, 21b of the cylinders 12a, 12b of the cylinder rows 11a, 11b that were previously operated with minimum lift or alternatively with zero lift are switched to maximum lift at the time t3.

As per the curve profiles 56 and 57, starting at the time t3, the increase in charge pressure demanded by a controller, and the torque reserve demanded by a controller, are continuously withdrawn.

After the switch from single-charger operation to two-charger operation of the respective cylinder row 11a, 11b at the time t3, the ignition angle is adjusted in the advancing direction, or in the direction of a position for optimum efficiency, again as per the curve profile 54, and the air recirculation valves 35a, 35b remain held open for a defined period of time Δt between the times t3 and t4, as per the curve profile 52. Thus, air recirculation valves are closed continuously or abruptly starting at the time t4 up until the time t5.

The overrun air recirculation valves 35a, 35b are held closed even during two-charger operation, as per the curve profile 53, and the compressor activation valves 36a, 36b are opened, specifically either actively by way of the control device 39 or, in the case of spring-loaded check valves, passively owing to the increase in charge pressure upstream thereof.

After the actual switch at the outlet valves 21a, 21b from minimum lift, or alternatively zero lift, to maximum lift, it is accordingly the case that, firstly, the ignition angle is adjusted back in the direction of optimum efficiency, and subsequently, the air recirculation valves 35a, 35b are closed. The delayed closing of the air recirculation valves 35a, 35b serves in particular for preventing undesired generation of noise.

The elimination of the torque reserve and the adjustment of the ignition angle back in the direction of optimum efficiency may be performed instantaneously, which would give rise to a delayed build-up of speed at the second turbochargers 14a, 14b.

What is preferred is a gradual elimination of the torque reserve and adjustment of the ignition angle back in the direction of optimum efficiency, in order thereby to utilize the advantage of the ignition angle on the exhaust-gas enthalpy and on a more rapid build-up of charge pressure at the second exhaust-gas turbochargers 14a, 14b.

The mixture quality of the fuel-combustion air mixture is set to the mixture quality demanded by the operating strategy, preferably to a lambda value of 1.

The above preparation and execution of the switch from single-charger operation to two-charger operation of the respective cylinder row 11a, 11b are of importance in particular when the switch is performed above the induction-based full load of the internal combustion engine.

The other switches between single-charger operation and two-charger operation of the respective cylinder row 11a, 11b, that is to say the switch from single-charger operation to two-charger operation of the respective cylinder row 11a, 11b below the induction-based full load of the internal combustion engine, and the switch from two-charger operation to single-charger operation of the respective cylinder row 11a, 11b, be it above the induction-based full load or below the induction-based full load, are less demanding. It is sufficient here, during the switch from two-charger operation to single-charger operation, for the second outlet valves 21a, 21b of the cylinders 12a, 12b to be switched from maximum lift to minimum lift or alternatively to zero lift, and during the switch from single-charger operation to two-charger operation, for the second outlet valves 21a, 21b of the cylinders 12a, 12b to be switched from minimum lift, or alternatively zero lift, to maximum lift, and for the charge pressure to be regulated by way of the wastegate valves 31a, 31b, 32a, 32b and/or the throttle flap 30.

The invention also relates to a control device 39 for carrying out the method. The control device 39 is preferably an engine control unit. The control device 39 comprises means for carrying out the method. Said means include hardware means and software means. The hardware means are data interfaces for the exchange of data with the units involved in carrying out the method, a processor for data processing, and a memory for data storage. The software means are program modules of engine control software.

What is claimed is:

1. A method for operating an internal combustion engine that has at least one cylinder row with multiple cylinders, the at least one cylinder row having a first exhaust-gas turbocharger and a second exhaust-gas turbocharger, the method comprising:
    actuating a driver actuable input device for selecting one of a first operating mode and a second operating mode;
    operating, via a controller of the internal combustion engine, valves associated with the respective cylinders of the internal combustion engine to provide charge air for the cylinders of the internal combustion engine either exclusively by the first exhaust-gas turbocharger of the at least one cylinder row of the internal combustion engine or by both the first exhaust-gas turbocharger of the at least one cylinder row of the internal combustion engine and the second exhaust-gas turbocharger of the at least one cylinder row of the internal combustion engine in a manner dependent on an at least one measured operating condition of the internal combustion engine compared to one of:
        a first set of operating conditions of the internal combustion engine if the driver has selected the first operating mode,
            wherein the first operating mode is an economy operating mode; and
        a second set of operating conditions of the internal combustion engine if the driver has selected the second operating mode,
            wherein the second operating mode is a sport operating mode.

2. The method of claim 1, wherein the at least one measured operating condition of the internal combustion engine comprises at least one of a measured torque provided by the internal combustion engine and a measured speed of the internal combustion engine.

3. The method of claim 2, when the driver selects the economy operating mode, the method further comprising:
    operating the valves associated with the respective cylinders of the internal combustion engine to provide charge air for the cylinders of the internal combustion engine exclusively by the first exhaust-gas turbocharger of the at least one cylinder row of the internal combustion engine when the measured torque provided by the internal combustion engine is above a torque threshold; and the measured speed of the internal combustion engine are is below an engine speed threshold;

operating valves associated with the respective cylinders of the internal combustion engine to provide charge air for the cylinders of the internal combustion engine by both the first exhaust-gas turbocharger of the at least one cylinder row and the second exhaust-gas turbocharger of the at least one cylinder row when the measured speed of the internal combustion engine is above the engine speed threshold; and operating the valves associated with the respective cylinders of the internal combustion engine to provide charge air for the cylinders of the internal combustion engine by both the first exhaust-gas turbocharger of the at least one cylinder row and the second exhaust-gas turbocharger of the at least one cylinder row of the internal combustion engine when the measured torque provided by the internal combustion engine is below the torque threshold, regardless of the measured speed of the internal combustion engine.

4. The method of claim 1, further comprising determining a power of the internal combustion engine demanded by the driver via the controller.

5. The method of claim 4, when the driver selects the sport operating mode, the method further comprising:

operating the valves associated with the respective cylinders of the internal combustion engine to provide charge air for the cylinders of the internal combustion engine by both the first exhaust-gas turbocharger of the at least one cylinder row and the second exhaust-gas turbocharger of the at least one cylinder row of the internal combustion engine when the power of the internal combustion engine demanded by the driver is above a power threshold;

operating the valves associated with the respective cylinders of the internal combustion engine to provide charge air for the cylinders of the internal combustion engine exclusively by the first exhaust-gas turbocharger of the at least one cylinder row of the internal combustion engine when the power of the internal combustion engine demanded by the driver is below the power threshold.

6. The method of claim 5, wherein the driver actuable input device is a switch or a button.

7. The method of claim 1, further comprising:

operating the valves associated with the respective cylinders of the internal combustion engine to provide charge air for the cylinders of the internal combustion engine exclusively by the first exhaust-gas turbocharger of the at least one cylinder row of the internal combustion engine when a catalytic converter heating operating mode is demanded.

8. The method of claim 7, wherein the catalytic converter heating operating mode for the internal combustion engine is demanded by the controller.

9. The method of claim 1, wherein the cylinders of the at least one cylinder row of the internal combustion engine are coupled respectively by first outlet valves and a first exhaust-gas duct to a turbine of the first exhaust-gas turbocharger of the at least one cylinder row and by second outlet valves and a second exhaust-gas duct to a turbine of the second exhaust-gas turbocharger of the respective cylinder row, a compressor of the respective first exhaust-gas turbocharger delivering charge air in a direction of the cylinders via a first charge-air line and a compressor of the respective second exhaust-gas turbocharger delivering charge air in the direction of the cylinders via a second charge-air line, the first charge-air line being assigned an overrun air recirculation valve, and the second charge-air line being assigned an air recirculation valve and a compressor activation valve, the method further comprising:

operating the valves associated with the respective cylinders of the internal combustion engine to provide charge air for the cylinders of the internal combustion engine exclusively by the first exhaust-gas turbocharger of the at least one cylinder row of the internal combustion engine in a steady-state operating state while operating the first outlet valves with a large valve lift and operating the second outlet valves with a small valve lift, with the overrun air recirculation valve assigned to the respective first charge-air line being closed, the air recirculation valve assigned to the respective second charge-air line being opened, and the compressor activation valve assigned to the respective second charge-air line being closed; and operating the valves associated with the respective cylinders of the internal combustion engine to provide charge air for the cylinders of the internal combustion engine by both the first exhaust-gas turbocharger of the cylinder row and the second exhaust-gas turbocharger of the at least one cylinder row of the internal combustion engine, in a steady-state operating state while operating the first and the second outlet valves with the large valve lift, with the overrun air recirculation valve assigned to the respective first charge-air line being closed, the air recirculation valve assigned to the respective second charge-air line being closed, and the compressor activation valve assigned to the respective second charge-air line being open.

10. A control device of an internal combustion engine, comprising executable instructions stored on non-transitory memory for:

actuating a driver actuable input device for selecting one of a first operating mode and a second operating mode;

operating, via a controller of the internal combustion engine valves associated with the respective cylinders of the internal combustion engine to provide charge air for the cylinders of the internal combustion engine either exclusively by the first exhaust-gas turbocharger of the at least one cylinder row of the internal combustion engine or by both the first exhaust-gas turbocharger of the at least one cylinder row of the internal combustion engine and the second exhaust-gas turbocharger of the at least one cylinder row of the internal combustion engine in a manner dependent on an at least one measured operating condition of the internal combustion engine compared to one of:

a first set of operating conditions of the internal combustion engine if the driver has selected the first operating mode,
wherein the first operating mode is an economy operating mode; and a second set of operating conditions of the internal combustion engine if the driver has selected the second operating mode,
wherein the second operating mode is a sport operating mode.

* * * * *